Aug. 12, 1952  E. C. FORTMANN  2,606,389
FISH LURE
Filed Oct. 22, 1949
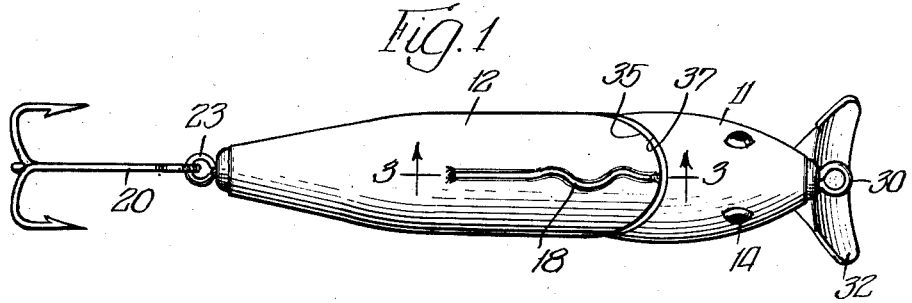
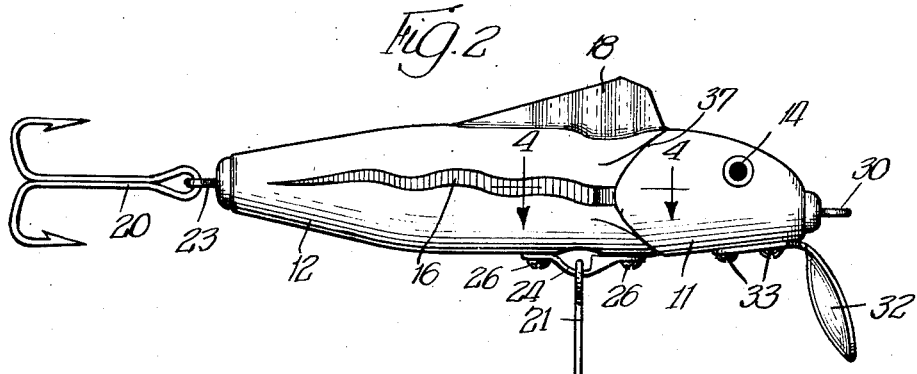
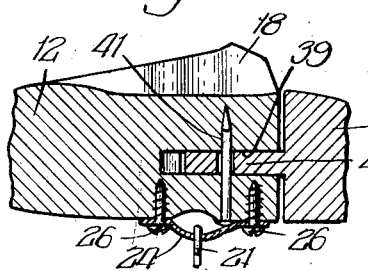
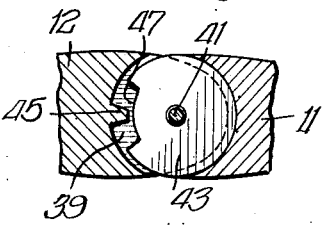
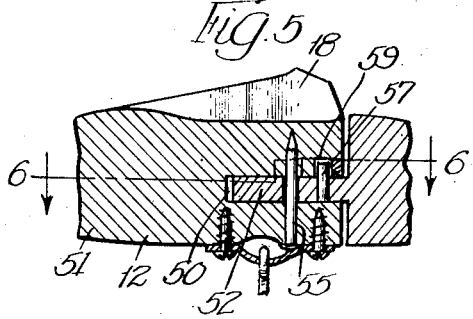
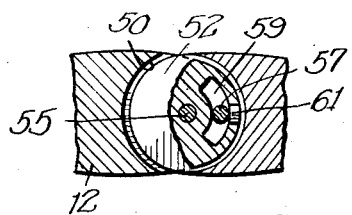
INVENTOR.
Edward C. Fortmann
BY
Wilkinson, Huxley, Byron & Hume
Attys Patented Aug. 12, 1952

2,606,389

UNITED STATES PATENT OFFICE 2,606,389

FISH LURE

Edward C. Fortmann, Chicago, Ill.

Application October 22, 1949, Serial No. 123,007

1 Claim. (Cl. 43—42.15)

This invention relates to a new and improved fish lure and more particularly to a fishing plug of the type formed to resemble a live minnow in appearance and action.

The present invention relates to an articulated plug of this type in which the head of the fish-shaped plug is pivotely connected to the body portion in such manner as to cause a lifelike movement when the plug is drawn through the water in casting or trolling. The contour of the related surfaces of the plug are such that the pivoting action simulates in appearance the opening and closing of the gills of the minnow represented by the plug. A further feature of the construction is the provision of a rigid dorsal fin of sinuous configuration which adds both to the appearance of the device and to the natural and lifelike swimming action when the plug is in motion.

It is an object of the present invention to provide a new and improved fishing lure or plug having a lifelike appearance and motion.

It is a further object to provide a device of this character which has a limited and controlled movement between head and body portions simulating normal gill action.

It is also an object to provide a construction in which relative movement is limited by internal elements of the device as distinguished from large external surfaces which may tend to jam or stick together.

It is an additional object to provide such a device with externally extending means on the body to coact with the water to impart movement to the body independently of the head.

Other objects of the invention are to provide a fish lure which is simple in design and construction and adapted for commercial production and use.

Other and further objects will appear as the description proceeds.

I have shown certain preferred embodiments of my invention in the accompanying drawings, in which—

Figure 1 is a plan view of the lure;

Figure 2 is a side elevation of the lure;

Figure 3 is a fragmentary vertical section taken on line 3—3 of Figure 1;

Figure 4 is a fragmentary horizontal section taken on line 4—4 of Figure 2;

Figure 5 is a fragmentary section similar to Figure 3, but showing a modified form of construction; and Figure 6 is a fragmentary section taken on line 6—6 of Figure 5.

The lure, as shown, comprises a head section 11 and a body section 12. It will be understood that the lure will normally be painted to somewhat resemble a fish, including eyes 14 and a general surface coloration. In the form shown, the side of the body of the fish is painted, as indicated at 16, with a wavy line of a contrasting color. The body portion is provided with a dorsal fin 18 which is formed of rigid material and is sinuous in form, as shown in Figure 1. The body portion 12 of the fish has the multiple hook element 20 attached to its rear end and it is also shown with a similar multiple hook 21 attached to the lower forward portion of the fish. The hook 20 is secured in place by means of an eye 23 threaded into the rear of the body, and the hook 21 is shown as suspended from a loop 24 which is secured to the body by means of screws 26.

The forward end of the head portion 11 is provided with an eye 30 for attachment to a leader or line connection. The dished plate 32 is secured to the under face of the head 11 by means of screws 33, this plate serving to control the movement of the head of the fish when pulled at the end of a line in trolling or casting.

The forward end of the body section 12 is formed upon a cylindrical arc 35, this forward end being convex so that the axis of the arc is located within the body and upon the central vertical axis thereof. The rear end of the head section 11 is formed upon a cylindrical surface 37 which is concave and has the same axis as the surface 35. It will be noted, from Figure 2, that due to the lateral curvature of the body and head, the rear side edges of the arc 37 appear curved in vertical appearance. This curvature is of such a character and so located as to simulate the gills of a fish.

As best shown in Figure 3, the body 12 is provided with a transverse slot 39 extending into the cylindrical face and extending beyond the axis of the cylindrical surfaces. The pivot pin 41 is located upon this axis, the pin being covered by the plate 24 to which the hook 21 is secured. The rear of the head portion 11 is provided with a tongue 43 which fits loosely into the slot 39, extending beyond the pivot pin 41 and having an opening to receive that pin.

As best shown in Figure 4, the body 12 is provided in the base of the slot 39 with a centrally located, forwardly extending lug 45, and the meeting face of the tongue 43 is provided with an arcuate recess 47. The sides of recess 47 coact with the lug 45 to limit the swinging movement between the head and body. A modified form of construction for limiting this swinging movement is shown in Figures 5 and 6. Here, the slot 50 in the body portion 51 has its rear surface formed on a complete arc without any lug 45. The tongue 52 extending from the head 53 is provided with a vertical opening for receiving the pivot pin 55 and pivoting thereon. The tongue 52 also carries an upwardly projecting stop pin 57 which is interfitted in an arcuate slot 59 formed in the upper face of the slot 50 in the body 51. As shown in Figure 6, the central slot 61 enters the arcuate slot 59 so that the parts may be assembled by moving the head and body together along their common axis and inserting the pivot pin 55.

In both forms of construction, the limiting stop means are internally located and, consequently, avoid any possibility of becoming entangled or blocked by external means. These stop means regulate swinging movement between the body and head so that the arcuate surfaces cannot become jammed at either limit of movement, which would prevent proper lifelike action of the bait in use. Also, the stop means are entirely enclosed and do not disfigure the lifelike appearance of the fish head and body. The sinuous dorsal fin 18 aids in giving the proper swinging action to the body relative to the head, and this swinging action causes the line 37, seen in Figure 2, to move in a manner to simulate the opening and closing of the gills by a swimming fish. Consequently, the bait has a lifelike action and is substantially jam-proof so that this action will continue throughout its use.

While I have shown certain preferred embodiments of my invention, these are to be understood to be illustrative only as it is capable of further variation, and I contemplate such modifications as come within the spirit and scope of the appended claim.

I claim:

An artificial bait in fishlike form comprising a head section and a body section, said sections having adjacent faces formed as interfitting sections of substantially semi-cylindrical surfaces, a pivot in one section located substantially upon the axis of the substantially semi-cylindrical surfaces, a portion of the substantially semi-cylindrical surface of said one section being slotted to a point beyond the pivot, a tongue extending from the other section into said slotted portion and engaging the pivot, and means for limiting movement between the sections to prevent jamming of the edges of said substantially semi-cylindrical surfaces, said means comprising a rigid fixed member constituting a portion of the slot and an arcuate recess formed in the tongue.

EDWARD C. FORTMANN.

REFERENCES CITED

The following references are of record in the file of this patent:

UNITED STATES PATENTS

| Number | Name | Date |
|---|---|---|
| 1,540,702 | Morriss | June 2, 1925 |
| 1,778,214 | Fisher | Oct. 14, 1930 |
| 1,786,568 | Kutz | Dec. 30, 1930 |
| 2,038,829 | Cronin | Apr. 18, 1936 |
| 2,504,796 | Boyd | Apr. 18, 1950 |